3,556,814
PROCESS OF COATING FOOD
Gordon R. Whitman, Weston, and Harold Rosenthal, Newtonville, Mass., assignors to General Foods Corporation, White Plains, N.Y., a corporation of Delaware
No Drawing. Continuation-in-part of application Ser. No. 500,284, Oct. 21, 1965, which is a continuation-in-part of application Ser. No. 287,201, June 12, 1963. This application Sept. 18, 1967, Ser. No. 668,675
Int. Cl. A23b 1/10, 7/16
U.S. Cl. 99—169                    7 Claims

ABSTRACT OF THE DISCLOSURE

A process of coating food by applying thereto a thermoplastic, edible composition comprising 10–50% gelatin, 50–90% of a polyhydric alcohol, typically propylene glycol, glycerine or sorbitol and mixtures thereof; a limited amount of water, not greater than about 5%, may be present.

CROSS-REFERENCE TO RELATED APPLICATIONS

This application is a continuation-in-part of our application Ser. No. 500,284, filed Oct. 21, 1965, which was a continuation-in-part of our application Ser. No. 287,201, filed June 12, 1963, both of which applications are now abandoned.

BRIEF SUMMARY OF THE INVENTION

This invention relates to protective coatings and particularly to edible coatings to be used on foodstuffs such as meats, fruits, vegetables, cheese, candies, other food products, on carton and paperboard stock and in other areas where a clear, flexible, grease-resistant coating would have merit. More particularly, this invention relates to a process of coating food.

The problem of packaging solid food materials so that they present a readily apparent and pleasing appearance despite production, shipping and display conditions and handling is one to which much attention has been directed. This is particularly so with perishable foods such as fruits, vegetables and meats. Despite commercial precautions in controlling atmospheric conditions, degree of refrigeration and humidity, such methods are only partially successful in preserving qualities such as freshness, texture and color. This problem is greatly magnified in the case of large primal cut portions or whole carcasses of meat. Little or no protection other than paper overwraps or open weave cloth shrouds are available to protect these products from color loss, shrink or moisture loss, freezer burn through dehydration at freezing temperatures, fat rancidity and mold or bacterial growth.

Many solutions to the problem of protecting a meat product, particularly those held at refrigerated temperatures, have been advanced.

Fats, waxes, aqueous protein or gum solutions with or without various additives, double coating using an edible undercoating and non-edible overcoating, non-edible, peelable hot melts and water emulsions of resin have all been proposed, tried experimentally and found wanting due to a variety of reasons. Most aqueous solutions or emulsions require a drying step to form a film of suitable strength since chilled gels are readily destroyed by normal handling. Many resultant films are opaque and provide poor product visibility. Many crack upon storage, particularly at freezer temperatures, providing limited product protection. Still others provide limited protection against any one of several major problems such as normal handling, color loss, shrink or moisture loss and mold or bacterial spoilage.

Gelatin, in particular, and in conjunction with other materials has been suggested for use as a coating material for food products, and in particular for protecting meat. This is because gelatin is edible, forms a film upon drying and is soluble in warm water so that it may readily be removed from the meat by immersing same in water at room temperature. In particular, gelatin solutions have been used in combination with materials such as water, fats, starches and gums to provide a coating; however, because of its low gel state film strength, lack of clarity, and the necessity of drying to form a strong film, those coatings have not received commercial favor. In addition, the degree of permeability to moisture transmission, the difficulties of application and film thickness control, and the rate of gas transfer have all mitigated against commercial success. It will be apparent that a coating for meat which tends to be so opaque that the meat within the coating cannot be readily viewed and its freshness and color quickly apparent to the prospective purchaser will have little sales value no matter what its advantages in inhibiting the transmission of gases and liquids therethrough, and that such a coating will not and, as a matter of fact, has not achieved any commercial success.

It is, therefore, a primary object of the present invention to provide a novel process of coating food products such as fresh meat employing protective films that will be transparent, warm water-soluble, non-productive of off-flavors or odors in the food products, edible and have a high degree of resistance to the transmission of liquids or gases therethrough.

The present invention is based on the discovery that a coating composition which includes gelatin and certain polyhydric alcohols and a limited quantity of water may be applied in a thin film to meat or other solid food products. The quantity of water in the composition is maintained at less than about 5% by weight of the total composition, it being preferred to maintain the moisture content at less than 2 to 3% preferably as low as possible. The gelatin, which comprises about 10 to 50% of the solution, is combined with about 50 to 90% of a polyhydric alcohol selected from the group consisting of propylene glycol, glycerol, ethylene glycol, 1,2,6-hexanetriol, sorbitol and mixtures thereof by the application of heat until a solution or hot melt of the gelatin and polyhydric alcohol is achieved. The hot melt so formed may then either be used directly by spraying or otherwise applying it to the meat or other food product, or, if allowed to cool, may be reheated for application.

DETAILED DESCRIPTION OF THE INVENTION

The gelatin used to form the composition employed in the process of the present invention may have any Bloom and may have been extracted by either an alkaline or acid process without regard to final pH. The gelatin may consist of mixtures of Type A and Type B gelatins or either type alone. While the Bloom of the gelatin is not an absolutely determinative factor, it is preferred that the Bloom be in excess of about 25, preferably more than 50. The upper range is about 275 to 300 or more, although gelatin having a Bloom of about 150 to 200, say 180 Bloom, is most preferred. As used in this specification, gelatin shall be construed to include zero Bloom gelatin, or hydrolysate. Zero Bloom gelatin tends to retain its tackiness on cooling to room temperature and does not set to a film. However, it is easy to apply in combination with a polyhydric alcohol and has been found suitable for use in gelatin-polyhydric alcohol combinations applied to frozen products to be thawed in water or brine before further processing.

The polyhydric alcohol which is used in solution with gelatin as part of the composition of matter employed in the process as set forth herein is most preferably propylene glycol or glycerol. While it has not been possible to determine whether all polyhydric alcohols will be operative to form a composition suitable for use in the present invention, ethylene glycol, 1,2,6-hexanetriol and sorbitol have also been found satisfactory.

It has also been found that mannitol, also a polyhydric alcohol, although it does not appear by itself to form a suitable solution with gelatin, may be combined with other operable polyhydric alcohols and gelatin to form a solution which will not separate out and is suitable for use in the process of this invention. Mannitol, a crystalline solid in its anhydrous form, does not readily form a solute for gelatin. However, about 1 to 25% of mannitol when employed in combination with 25 to 89% of propylene glycol, glycerol, ethylene glycol, 1,2,6-hexanetriol or sorbitol does form a solution with gelatin, the gelatin being used in about 10 to 50% by weight of the final solution. This solution is formed readily, especially in the presence of added water, e.g., from about 2 to about 3%, and the mannitol does not separate out therefrom.

It has also been discovered that the coating composition suitable for use in the process of the present invention including gelatin and at least one polyhydric alcohol may be further improved in certain of its properties by the incorporation therein of an acetylated monoglyceride. For example, it has been unexpectedly found that vapor loss transmission of a food such as meat coated with such composition may be markedly reduced by incorporating an acetylated monoglyceride in an amount of from about 0.5 to 5.0% of the total weight of the coating composition. While larger amounts, for example, from about 5 to 10%, may be employed, no special advantage appears to be afforded thereby. Moreover, because of their insolubility in water, the use of acetylated monoglycerides in amounts greater than about 1% is not desirable for those applications where it is contemplated to remove the film by immersing the coated food in warm water. Acetylated monoglycerides derived either through the acetylation of an edible monoglyceride obtained from the reaction of a fat and glycerol or by the interesterification of an edible fat or oil with triacetin are suitable.

As stated hereinbefore, the moisture content of the composition employed in the process of the present invention is critical, moisture contents in excess of about 5% of the final solution not being desired. Preferably, the moisture content should not be in excess of about 3%, and it has been found advantageous to keep the moisture level at no greater than 2% by weight of the gelatin-polyhydric alcohol solution. It would be most desirable in many cases to have the moisture content less than 2%, but this has been found difficult since dry gelatin usually contains about 10 to 11% moisture and a U.S.P. grade of propylene glycol, for example, has a moisture content of about 0.01%. Therefore, without the addition of water to the mixture of polyhydric alcohol and gelatin, the final solution will be found to contain moisture at a level of about 2 to 3%. A limitation of the quantity of moisture present in the final solution has been found to greatly increase the resistance of the film to moisture permeability and gas transmission. By limiting the passage of gases and liquids, access of air-borne bacteria to the food product coated is likewise inhibited. In addition, food or meat already contaminated with bacteria will have less growth of the aerobic type due to low gas transmission. Additional moisture also lowers the setting and melting temperature of the film and decreases film strength.

The process of this invention is advantageous in providing quick-setting food coatings having substantial freedom from tackiness. Thus, after the food or meat has been coated with a hot melt composition according to the present invention, it may be wrapped immediately after coating. Unlike the usual paper-wrapped meat which will be found to have the paper adhered thereto when unpacked, the hot melt-coated meat will not stick to wrapping paper, thus reducing the cost of product handling and cleaning before use.

The process of this invention is further advantageous in providing food coatings having good flexibility at low temperatures. For example, even though the coated food such as meat is subjected to sub-zero (−40° F.) blast freezer temperatures, the gelatin-polyhydric alcohol coatings show good flexibility, so that if the meat is handled or mishandled when it is at such low temperatures, the skin-tight film of the present composition which protects it will not tend to break or crack, thus maintaining protection of the meat over a more extended period of time.

The process of this invention is also advantageous in providing food coatings which markedly reduce weight loss and color loss from the coated food such as meat. These improvements appear to result from the presence of a critical amount of moisture, i.e., not greater than about 5% by weight in the coating composition.

Moreover, the process of this invention is advantageous in providing food coatings which are not only characterized by their lack of opacity but also capable of being used without supporting undercoatings and/or protective topcoatings.

In preparing the coating composition, a polyhydric alcohol selected from the group consisting of propylene glycol, glycerol, ethylene glycol, 1,2,6-hexanetriol, and sorbitol and mixtures thereof is first heated to a temperature of about 75° to 100° C. When the polyol has reached that temperature, gelatin is added rapidly to the polyol with moderate agitation, the addition of gelatin being continuous until all the gelatin has been introduced and a clear, homogeneous melt of gelatin and the polyol forms that does not separate. If desired, mannitol and/or an acetylated monoglyceride are also added simultaneously with or immediately prior to the addition of gelatin. The resultant solution, or hot melt, can either be utilized directly in its liquid form, or cooled until it solidifies, and then be reheated and used by any subsequent time. Upon being cooled, the hot melt forms a solid composition of matter which is warm water-soluble and thermoplastic in nature in that it can be reheated to its hot melt state and then cooled.

A most preferred composition for use in the process of coating of food products is a solution consisting of propylene glycol, gelatin and water, the propylene glycol being present in about 60–90% by weight of the solution, the gelatin about 10–40% by weight, and the water less than about 5% by weight.

The gelatin preferably has a Bloom of at least 25 and is most preferably in the range of 150–250 Bloom. It has been observed that the use of higher Bloom gelatin permits some water to be later added and included in the final composition without apparently affecting the properties of the coating or film.

To form the preferred composition the propylene glycol is heated to about 75°–100° C., and the gelatin added rapidly and continuously until there is no grittiness to the samples withdrawn from the resulting solution. The solution is then cooled to form a non-tacky, warm water-soluble composition of matter that has a melting point usually of about 50°–75° C. Its melting point is always below 100° C.

The solid composition is either reheated to a temperature above about 60° C., more preferably to about 80°–140° C., or utilized directly in hot melt form after it has been prepared. When it is to be applied to a food product such as meat, the meat can be dipped in a solution of the gelatin-polyol mixture, or the hot melt can be brushed directly on the meat. At present, a very economic control of film thickness for food applications appears to be by spraying the hot melt on the food. Thus, for example, the solution may be sprayed on fresh meat directly after slaughter or at any other point during the fabrication of primal or retail cuts of meat. Spraying may be accomplished by atomizing the hot fluid coating with preheated air or without air using hydraulic techniques. Other methods for applying the composition include falling film and enrobing procedures. Being a thermoplastic, the coating sets quickly and adheres well to the tissue, providing a skin-tight film thereabout. In its hot melt form the present composition is adhesive to most materials. The properties of the composition, such as flexibility, viscosity and depth of penetration into a product to which it is applied, can be varied by using different quantities of gelatin in the mixture and varying the Bloom of the gelatin. Meat to which the composition has been applied can be immediately frozen or refrigerated without cracking of the skin-tight film thereabout and, therefore, without loss of effectiveness of the film as a gas transmission and moisture vapor barrier, and an inhibitor against atomspheric or environmental bacterial contamination.

When applying the gelatin-polyhydric alcohol coating to food by means of spraying, the viscosity of the hot melt becomes an important factor. Thus, a hot melt which consists of about 70% glycerol and 30% of 250 Bloom gelatin has a viscosity at 180° F. of about 5000 to 8000 cps. A hot melt formed from 10%, 150-Bloom gelatin and 90% propylene glycol has a viscosity at 180° F. of about 100–200 cps. While improved spray guns may augment the ability to spray more viscous materials than can be sprayed from conventional apparatus, an upper limit of about 1000 cps. at the spraying temperatures has been found the practical maximum viscosity that can be economically sprayed. Elevated spraying temperatures must be maintained in the spraying apparatus used, and it has been found advantageous to maintain a discharge temperature from the apparatus of about 180° to 280° F.

This invention will be better understood by reference to the following specific examples of the practice of the process thereof:

EXAMPLE I

A hot melt was prepared by first heating 180 grams of U.S.P. propylene glycol to a temperature of 90° C. with moderate agitation. To the vortex formed by the agitation 45 grams of ground gelatin having a Bloom of 275 was then added continuously and rapidly over a period of three minutes. Maintenance of the temperature above 80° C. and agitation were continued for 30 minutes, after which a sample withdrawn from the hot melt solution indicated that complete solution had taken place by lack of grittiness in the sample. The hot melt was permitted to cool to room temperature at which it formed a solid having a moisture content of about 2% and having the appearance of a tack-free, clear, flexible gum rubber. A primal cut of pork sprayed with the melt at a temperature of 90° C. was coated with a skin-tight, flexible, edible, thermoplastic coating which showed good adherence properties to the meat. The coating withstood sub-zero freezing temperatures for several months of storage and was completely dissolved and removed from the meat by immersing the meat in water at 120° F.

EXAMPLE II

A hot melt was formed by heating 214 grams of propylene glycol to a temperature of 90° C. with constant, moderate agitation, and adding 53 grams of 180 Bloom gelatin to the hot propylene glycol with constant stirring. To the gelatin-propylene glycol mixture was immediately added 8.5 grams of water, and the mixture was stirred for 15 minutes after which complete solution was indicated. The hot melt was permitted to cool to room temperature at which it was found to have a moisture content of 5% and to be a tack-free, clear, homogeneous, flexible, rubber-like material. The solid composition was later reheated to 90° C. and sprayed onto a pork cut forming a flexible, adherent coating which could be subsequently dissolved and removed from the meat by immersion of the meat in water at 120° F.

EXAMPLE III

Hot melts and solid compositions of matter were formed by adding 65 grams of 180 Bloom gelatin to 260 grams of ethylene glycol at 90° C. without the addition of water. The same hot melt was formed substituting 1,2,6-hexanetriol for the ethylene glycol, and here also a hot melt and solid composition were obtained in which total solution of the ingredients was indicated. The hot melts were applied to soft cheeses and cheddar cheese blocks by dipping. Good protection against surface mold growth was exhibited and the films were easily removed by peeling them from the coated cheese.

EXAMPLE IV

A hot melt was formed using propylene glycol and the procedure of Example I except that zero Bloom gelatin was substituted for the 275 Bloom gelatin. At room temperature the hot melt had cooled to a tacky adhesive material that could be used as a coating to protect frozen foods.

EXAMPLE V

A hot melt was formed by heating 180 grams of powdered sorbitol at 110° C. until it was a clear melt and then adding 20 grams of 245 Bloom gelatin to the melt using moderate agitation to avoid air entrapment. The hot melt was then allowed to cool room temperature. The solid was noted to be extremely hard but when remelted could be readily applied to chocolate-coated candy to form a clear, tack-free coating.

EXAMPLE VI

A hot melt was prepared by admixing 80 grams of U.S.P. propylene glycol at 90° C. with moderate agitation and 40 grams of 245 Bloom gelatin. To this hot mixture was added 280 grams of sorbitol which had previously been heated to 110° C. The mixture was stirred at slow speed to avoid air entrapment.

Chocolate-coated candy bars which had been previously chilled at 2°–6° C. were then coated by dipping the bars into the propylene glycol-gelatin-sorbitol melt which was maintained at a temperature of 110° C. The so-coated bars were noted, after one day's storage at room temperature, to have a clear, hard, non-tacky film that adhered well to the chocolate.

EXAMPLE VII (A) Commercially available acetylated monoglycerides sold under the trademark "Myvacet" and further designated as "9–40," "7–00" and "5–00" were added at a 1% level to a hot (90° C.) melt of propylene glycol and gelatin prepared as in Example I. Shrinkage of fresh pork livers, coated with the propylene glycol-gelatin hot melts containing various acetylated monoglycerides, was then determined after dipping the livers into the hot melts, chilling them at 0° F. for one hour and storing them at 28°–32° F. Shrinkage of uncoated fresh pork livers was also determined for purposes of comparison. Shrinkage was measured by calculating the percentage weight loss of the livers after various storage times at 28°–32° F. The results are tabulated as follows:

|  | Uncoated (control) | Coated with propylene glycol-gelatin coating of Example I containing 1% "Myvacet" | | | | | | |
|---|---|---|---|---|---|---|---|---|
|  |  | Sample | | 9–40 sample | | 7–00 sample | | 5–00 sample | |
|  |  | 1 | 2 | 1 | 2 | 1 | 2 | 1 | 2 |
| Percent coating |  | 7.0 | 8.2 | 4.8 | 5.2 | 6.8 | 7.6 | 5.7 | 6.6 |
| Percent weight loss after 17 hours | 16.8 | 10.0 | 13.0 | 12.9 | 9.0 | 11.7 | 11.6 | 10.0 | 10.0 |
| Percent weight loss after 41 hours | 31.7 | 21.5 | 25.9 | 24.3 | 19.4 | 22.0 | 22.8 | 18.6 | 18.9 |
| Percent weight loss after 113 hours | 50.3 | 39.4 | 45.4 | 40.4 | 36.6 | 36.8 | 40.5 | 34.2 | 34.7 |

From the foregoing data it is seen that shrinkage of meats, e.g., pork livers, may be markedly reduced employing the process of the present invention. Thus, the percentage weight loss of an uncoated meat sample is noted to be in excess of 50% after storage for approximately 4½ days at 28°–32° F. By contrast, the use of a propylene glycol-gelatin composition according to the present invention as a coating affords a significant, approximately 10–20%, reduction in shrinkage loss. Further improvement is seen by the use of propylene glycol-gelatin compositions containing 1% acetylated monoglycerides; the incorporation of these additives at such level cuts the overall shrinkage loss by approximately 20–30%.

(B) A series of experiments similar to those described in (A) were conducted employing "Myvacet 5–00" at levels of 0%, 1%, 2% and 5% with the propylene glycol-gelatin composition prepared as in Example I. The percentage weight loss was determined for coated samples that had been stored for 4½ days at 40°–45° F. while being exposed to fan blown air to accelerate shrinkage loss. The results indicated that shrinkage could be further reduced by using higher levels of acetylated monoglycerides. However, the more significant decrease in shrinkage was evident at the 1% level. While the 2%–5% levels afforded additional protection in cutting weight loss due to shrinkage, the reduction in percentage weight loss was not noted to be directly proportional to the higher amounts of acetylated monoglycerides employed.

EXAMPLE VIII

The effect of moisture content in polyhydric alcohol-gelatin compositions was demonstrated in a series of experiments in which the propylene glycol-gelatin composition of Example I, containing 2% moisture, was compared with propylene glycol-gelatin compositions containing 5, 10, 15 and 25% moisture and in which the propylene glycol-gelatin ratio was maintained approximately constant.

The procedure employed involved application of the compositions to chops freshly cut from a fresh pork loin. The compositions were applied directly to the chops which were then refrigerated at 45°–50° F. The tackiness or set of the coatings was noted after ten minutes of refrigerated storage. Percentage weight loss was determined and color retention was observed after storage of the coated pork chops after six days at 45°–50° F.

Additional samples were coated in the identical manner with the same compositions and then frozen. After storage of the coated pork chops for six days at −20° F., percentage weight loss was determined and color retention was also observed.

The results of the refrigerator and freezer storage experiments on coated pork chops are as follows:

SIX-DAY REFRIGERATED STORAGE

| Percent moisture in coating | Percent weight loss | Color retention | Tackiness* or set |
|---|---|---|---|
| 2 | 9.88 | Good | Firm set—not tacky. |
| 5 | 10.38 | do | Do. |
| 10 | 9.42 | Darkened | Sl. soft—sl. tacky. |
| 15 | 13.91 | Very dark | Soft and tacky. |
| 25 | 16.57 | do | Do. |

*10 minutes *after* application of coating.

SIX-DAY FROZEN STORAGE

| Percent moisture in in coating | Percent weight loss | Color retention |
|---|---|---|
| 2 | .37 | Good. |
| 5 | .85 | Do. |
| 10 | .65 | Darkened. |
| 15 | 1.40 | Very dark. |
| 25 | 2.04 | Do. |

From the foregoing results, it is apparent that the process of this invention in which polyhydric alcohol-gelatin compositions containing less than about 5% moisture are applied to meat such as freshly cut pork chops are surprisingly effective in preserving color of the meat. While such desirable color retention is noted in meat stored at freezer temperatures, it is most significant in meat stored at refrigerator temperatures. Similarly, the lack of tackiness in the coatings prepared from these compositions is especially advantageous. Further, the markedly good reduction in weight loss brought about by the use of these compositions for coating meat is also apparent. By contrast, the application of other polyhydric alcohol-gelatin compositions having higher moisture contents to meat was found to result in poor color retention and an increase in weight loss, and tackiness of such coatings was also observed.

Fresh meats coated according to the process of the present invention are thus noted to retain their characteristic red color for longer periods. Such finding was unexpected and is apparently accounted for by the fact that the coatings permit limited access of oxygen to the meat and yet prevent contamination of the meat by air borne bacteria.

While the process of the present invention has been described herein with particular reference to its use in providing a film to protect fresh meat, it is evident that it may also be used to coat frozen, smoked and processed meat products, as well as other food products such as, for example, cheeses, candies, etc. Other foods that have been successfully coated are fish; vegetables, e.g., tomatoes, cucumbers and radishes; bakery products, e.g., muffins and bread; and fruit, e.g., apples, bananas, peaches and strawberries. When coated food products having a high moisture content, e.g., meats, fruits, are frozen and later defrosted syneresis is frequently noted. However, the process of this invention appears to be especially effective in retarding or eliminating the tendency of such foods to exhibit this phenomenon.

For each use, different conditions in the process of applying the composition and different quantities of the ingredients in the coating composition will be preferred. Thus, a mixture of 80% propylene glycol and 20% 180 Bloom gelatin with no moisture being added is most preferred with particular respect to the use of the composition to coat meat. The maximum moisture of such a preferred composition is generally about 2% to 3%.

It will be apparent that alterations, modifications and substitutions in the materials and conditions set forth hereinbefore will be obvious to those skilled in this art. For example, other hydrocolloids may be substituted for gelatin in the use of the latter herein. Such obvious alterations, modifications and substitutions are deemed to be included within the scope of the present invention, which is limited only by the following appended claims.

What is claimed is:

1. The process of coating a solid food which comprises applying directly to the food a thin coating of a thermoplastic composition of matter at a temperature above the melting point of said composition but not greater than about 140° C., said composition comprising a solution consisting essentially of about 10 to 50% gelatin and 50 to 90% of a polyhydric alcohol selected from the group consisting of propylene glycol, glycerol, and sorbitol and mixtures thereof, the moisture content of said composition being not greater than about 5%, said composition adhering to the food and setting in contact therewith to provide a film about the food.

2. The process claimed in claim 1 in which the moisture content of said composition is not greater than about 3%.

3. The process claimed in claim 1, in which the thermoplastic composition is applied to food by spraying at a temperature of about 80–140° C.

4. The process claimed in claim 1, in which the food is frozen after the composition has set in contact therewith.

5. The process of coating a solid food which comprises applying directly to the food a thin coating of a thermoplastic composition of matter at a temperature above the melting point of said composition but not greater than 140° C., said composition comprising a solution consisting essentially of about 10 to 50% gelatin, about 50–89% of a polyhydric alcohol selected from the group consisting of propylene glycol, glycerol and sorbitol and mixtures thereof, and about 1% of an acetylated monoglyceride, the moisture content of said composition being not greater than about 5%, said composition adhering to the food and setting in contact therewith to provide a film about the food.

6. The process of coating meat which comprises applying directly to the meat a thin coating of a thermoplastic composition of a matter at a temperature above the melting point of said composition but not greater than 140° C., said composition consisting essentially of about 10 to 40% gelatin and 60 to 90% propylene glycol, the moisture content of said composition being not greater than about 5%, said composition adhering to the meat and setting in contact therewith to provide a continuous film about the meat.

7. The process claimed in claim 6, in which the moisture content of said composition is not greater than about 3%.

References Cited

UNITED STATES PATENTS

| | | | |
|---|---|---|---|
| 2,840,474 | 6/1958 | Wirt et al. | 99—166 |
| 2,868,656 | 1/1959 | Patten et al. | 99—166 |
| 2,955,043 | 10/1960 | Rosenthal | 99—169 |

RAYMOND N. JONES, Primary Examiner

J. R. HOFFMAN, Assistant Examiner

U.S. Cl. X.R.

99—166, 168